United States Patent
Emberling et al.

(10) Patent No.: US 12,033,238 B2
(45) Date of Patent: Jul. 9, 2024

(54) REGISTER COMPACTION WITH EARLY RELEASE

(71) Applicant: Advanced Micro Devices, Inc., Santa Clara, CA (US)

(72) Inventors: Brian D. Emberling, Santa Clara, CA (US); Joseph Lee Greathouse, Austin, TX (US); Anthony Thomas Gutierrez, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/030,852

(22) Filed: Sep. 24, 2020

(65) Prior Publication Data

US 2022/0092725 A1 Mar. 24, 2022

(51) Int. Cl.
*G06T 1/20* (2006.01)
*G06T 1/60* (2006.01)

(52) U.S. Cl.
CPC . *G06T 1/60* (2013.01); *G06T 1/20* (2013.01)

(58) Field of Classification Search
CPC ... G06T 1/20; G06T 1/60; G06F 8/441; G06F 9/30098; G06F 9/30105; G06F 9/3887; G06F 15/8007
USPC .................................................. 345/501, 559
See application file for complete search history.

(56) References Cited

U.S. PATENT DOCUMENTS

| | | | |
|---|---|---|---|
| 5,031,174 A | 7/1991 | Natsume | |
| 5,826,082 A | 10/1998 | Bishop et al. | |
| 5,996,068 A | 11/1999 | Dwyer, III et al. | |
| 7,383,423 B1 | 6/2008 | Hughes et al. | |
| 7,697,007 B1* | 4/2010 | Duluk, Jr. | G06F 9/4843 718/107 |
| 9,667,723 B2 | 5/2017 | Pandya | |
| 10,079,916 B2 | 9/2018 | Roberts et al. | |
| 10,372,500 B1* | 8/2019 | Thomas | G06F 9/5055 |
| 10,691,457 B1* | 6/2020 | Kountanis | G06F 9/384 |
| 11,204,765 B1* | 12/2021 | Du | G06T 1/20 |

(Continued)

OTHER PUBLICATIONS

Ergin et al., Increasing Processor Performance Through Early Register Release, IEEE International Conference on Computer Design: VLSI in Computers and Processors, 2004, 8 pages.*

(Continued)

*Primary Examiner* — Jacinta M Crawford
(74) *Attorney, Agent, or Firm* — Kowert, Hood, Munyon, Rankin & Goetzel, P.C.; Rory D. Rankin (57) ABSTRACT

Systems, apparatuses, and methods for implementing register compaction with early release are disclosed. A processor includes at least a command processor, a plurality of compute units, a plurality of registers, and a control unit. Registers are statically allocated to wavefronts by the control unit when wavefronts are launched by the command processor on the compute units. In response to determining that a first set of registers, previously allocated to a first wavefront, are no longer needed, the first wavefront executes an instruction to release the first set of registers. The control unit detects the executed instruction and releases the first set of registers to the available pool of registers to potentially be used by other wavefronts. Then, the control unit can allocate the first set of registers to a second wavefront for use by threads of the second wavefront while the first wavefront is still active.

20 Claims, 8 Drawing Sheets

(56) References Cited

U.S. PATENT DOCUMENTS

| | | |
|---|---|---|
| 2003/0041138 A1 | 2/2003 | Kampe et al. |
| 2003/0135716 A1 | 7/2003 | Vinitzky |
| 2007/0143582 A1 | 6/2007 | Coon et al. |
| 2008/0028403 A1 | 1/2008 | Hoover et al. |
| 2009/0300634 A1* | 12/2009 | Ramsey ............... G06F 9/5011 718/104 |
| 2011/0055838 A1 | 3/2011 | Moyes |
| 2011/0161616 A1 | 6/2011 | Tarjan et al. |
| 2011/0296428 A1 | 12/2011 | Rawson, III et al. |
| 2012/0198214 A1* | 8/2012 | Gadre ................. G06F 9/3851 712/225 |
| 2012/0216004 A1* | 8/2012 | Abernathy ........... G06F 9/3013 711/E12.002 |
| 2012/0290756 A1 | 11/2012 | Damodaran et al. |
| 2014/0013079 A1 | 1/2014 | Watson, Jr. et al. |
| 2014/0122560 A1 | 5/2014 | Ramey et al. |
| 2014/0254591 A1 | 9/2014 | Mahadevan et al. |
| 2017/0139707 A1 | 5/2017 | Jang |
| 2018/0096446 A1* | 4/2018 | Chen .................... G06F 9/3012 |
| 2018/0165092 A1* | 6/2018 | Du ...................... G06F 9/30141 |
| 2018/0210732 A1* | 7/2018 | Zhu ........................ G06F 15/78 |
| 2018/0275991 A1* | 9/2018 | Khorasani ........... G06F 15/8007 |
| 2020/0073664 A1* | 3/2020 | Ashar ................. G06F 9/30032 |
| 2020/0159535 A1* | 5/2020 | Bonanno ................ G06F 9/384 |
| 2020/0394041 A1* | 12/2020 | Lueh .................... G06F 9/5016 |
| 2021/0358076 A1* | 11/2021 | Gruber ................. G06F 9/5022 |

OTHER PUBLICATIONS

International Search Report and Written Opinion in International Application No. PCT/US2016/046886, dated Nov. 23, 2016, 12 pages.

Cheng, et al., U.S. Appl. No. 14/928,981, entitled "In-Memory Interconnect Protocol Configuration Registers", filed Oct. 30, 2015, 36 pages.

International Search Report and Written Opinion in International Application No. PCT/US2021/051818, dated Dec. 23, 2021, 13 pages.

* cited by examiner

REGISTER COMPACTION WITH EARLY RELEASE

BACKGROUND

Description of the Related Art

Graphics processing units (GPUs) and other multi-threaded processing units typically include multiple processing elements (which are also referred to as processor cores or compute units) that concurrently execute multiple instances of a single program on multiple data sets. The instances are referred to as threads, waves, or wavefronts. Several waves are created (or spawned) and then dispatched to each processing element in a multi-threaded processing unit. The processing unit can include hundreds of processing elements so that thousands of threads are concurrently executing programs in the processing unit. In a multi-threaded GPU, the threads execute different instances of a kernel to perform calculations concurrently or in parallel. Threads that are executing concurrently in a multithreaded processing unit share some of the resources of the processing unit. Shared resources include vector general-purpose registers (VGPRs) that store state information for the threads, local data shares (LDSs) that are used to store data for the threads, bandwidth available to move information between a local cache hierarchy and a memory, and the like.

The number of registers allocated to a thread is typically determined at launch. For example, the number of registers to allocate to a thread can be included in the metadata of the corresponding kernel. The number of registers needed by a thread can be determined by a compiler, by a programmer, at run-time, or otherwise. The problem with statically allocating a number of registers to a thread is that there are a limited number of available registers and threads will end up competing with each other for this limited number of registers. Alternatively, a thread may end up using fewer registers than was allocated. In such a case, registers resources that might have otherwise been used by other threads go unused.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing register compaction with early release are disclosed herein. In one implementation, a processor includes at least a command processor, a plurality of compute units, a plurality of registers, and a control unit. Registers are statically allocated to wavefronts by the control unit when wavefronts are launched by the command processor on the compute units. In response to determining that a first set of registers, previously allocated to a first wavefront, are no longer needed, the first wavefront executes an instruction or sends a message to the control unit that the first set of registers can be released. The control unit receives the message and releases the first set of registers to the available pool of registers to potentially be used by other wavefronts. For example, the control unit can allocate the first set of registers to a second wavefront for use by threads of the second wavefront while the first wavefront is still active.

Figure 1:
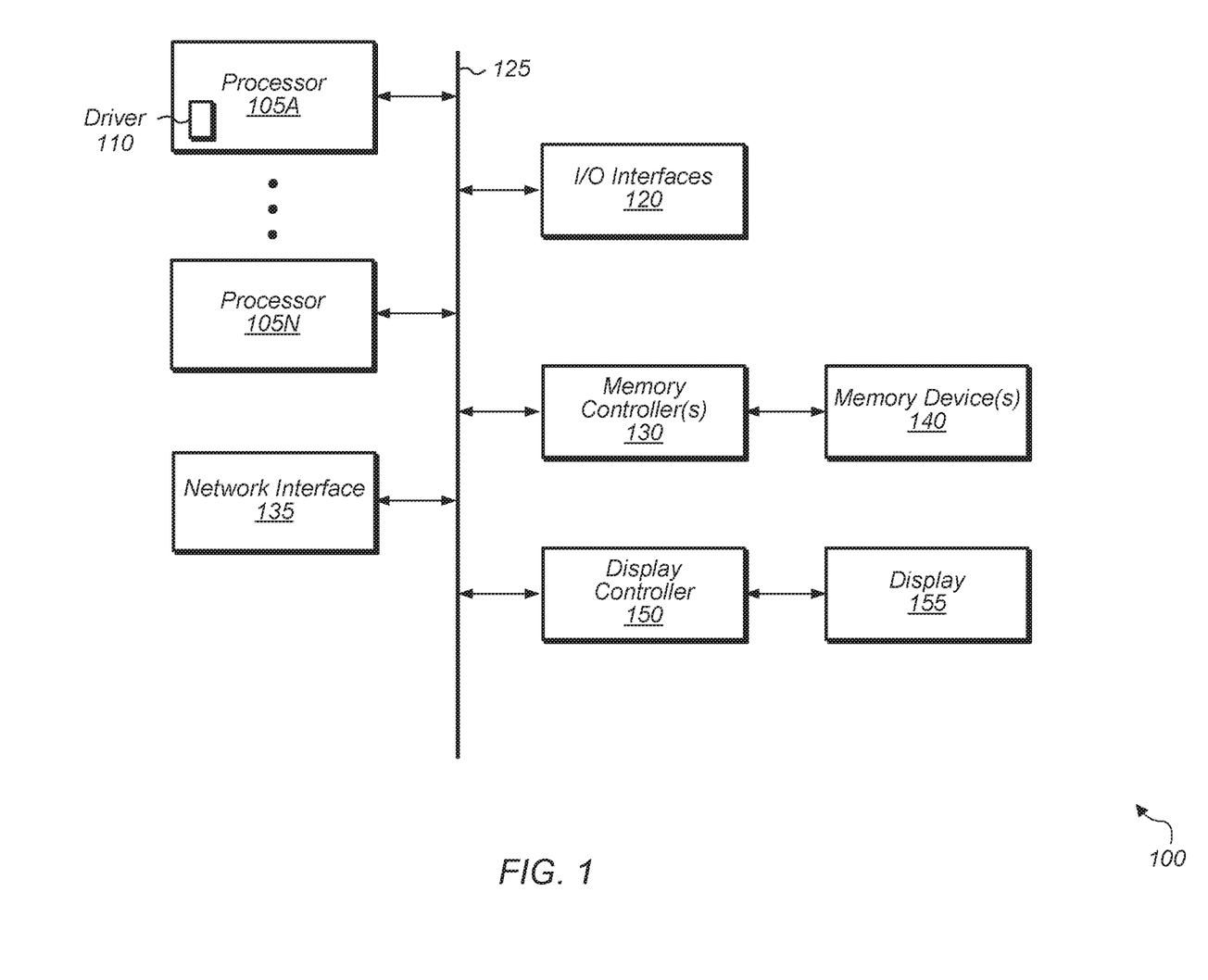
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. It is noted that depending on the implementation, driver 110 can be implemented using any suitable combination of hardware, software, and/or firmware. In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. While memory controller(s) 130 are shown as being separate from processor 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
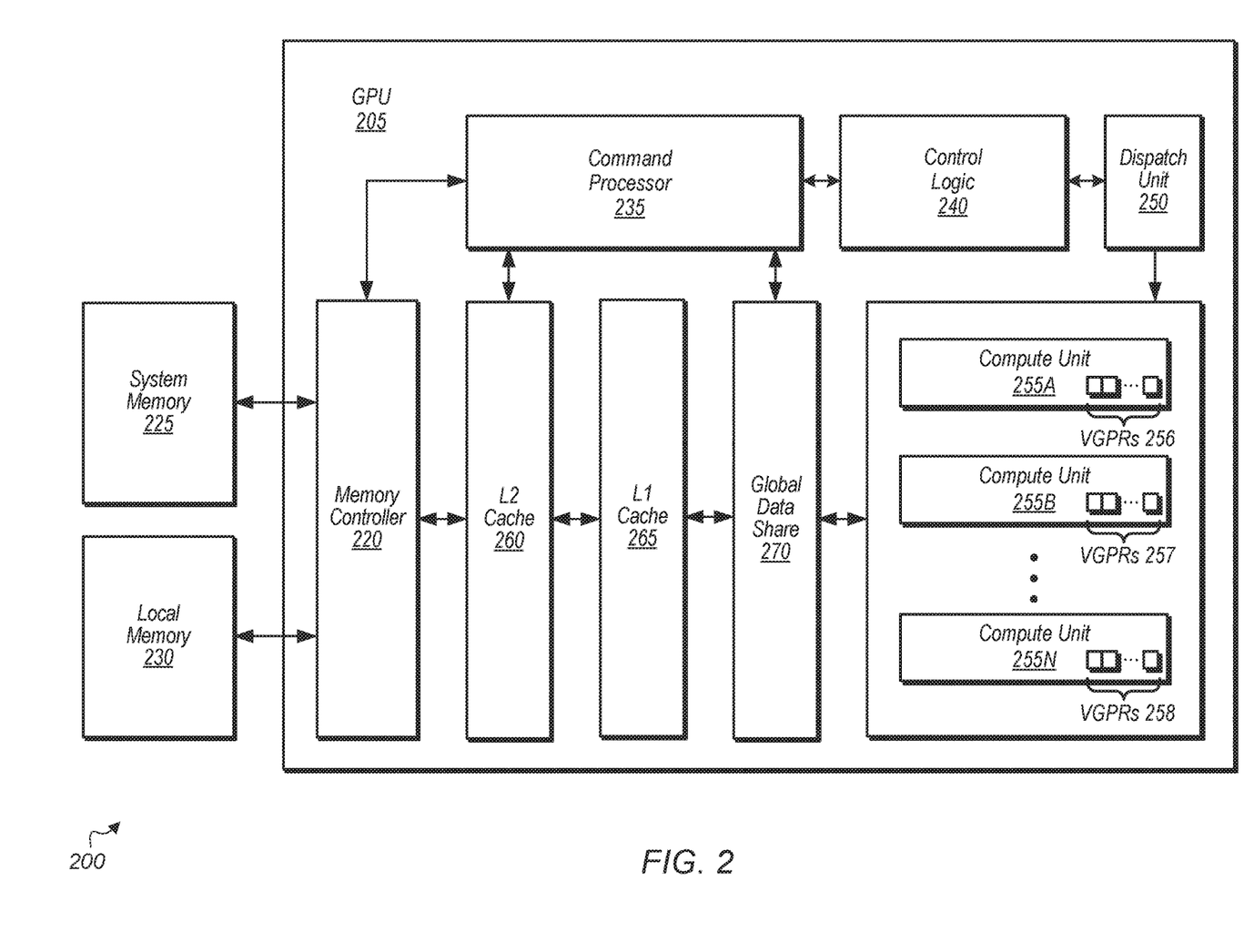
FIG. 2 is a block diagram of another implementation of a computing system.

Turning now to FIG. 2, a block diagram of another implementation of a computing system 200 is shown. In one implementation, system 200 includes GPU 205, system memory 225, and local memory 230. System 200 can also include other components which are not shown to avoid obscuring the figure. GPU 205 includes at least command processor 235, control logic 240, dispatch unit 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1).

In various implementations, computing system 200 executes any of various types of software applications. As part of executing a given software application, a host CPU (not shown) of computing system 200 launches work to be performed on GPU 205. In one implementation, command processor 235 receives kernels from the host CPU, and command processor 235 uses dispatch unit 250 to issue corresponding wavefronts to compute units 255A-N. Typically, registers, such as vector general purpose registers (VGPRs) 256 of compute unit 255A, are statically allocated to wavefronts executing on compute units 255A-N. However, some wavefronts may not use all of their registers while other wavefronts fully utilize their registers and are awaiting the availability of more registers. To mitigate this scenario, an active wavefront can execute an instruction to release a portion or the entirety of their registers to the unused pool to be reallocated to other wavefronts. This allows VGPRs 256, VGPRs 257 of compute unit 255B, and VGPRs 258 of compute unit 255N to be used in a more efficient fashion by the various wavefronts being executed by compute units 255A-N. It is noted that VGPRs 256-258 are representative of any number of VGPRs.

Figure 3:
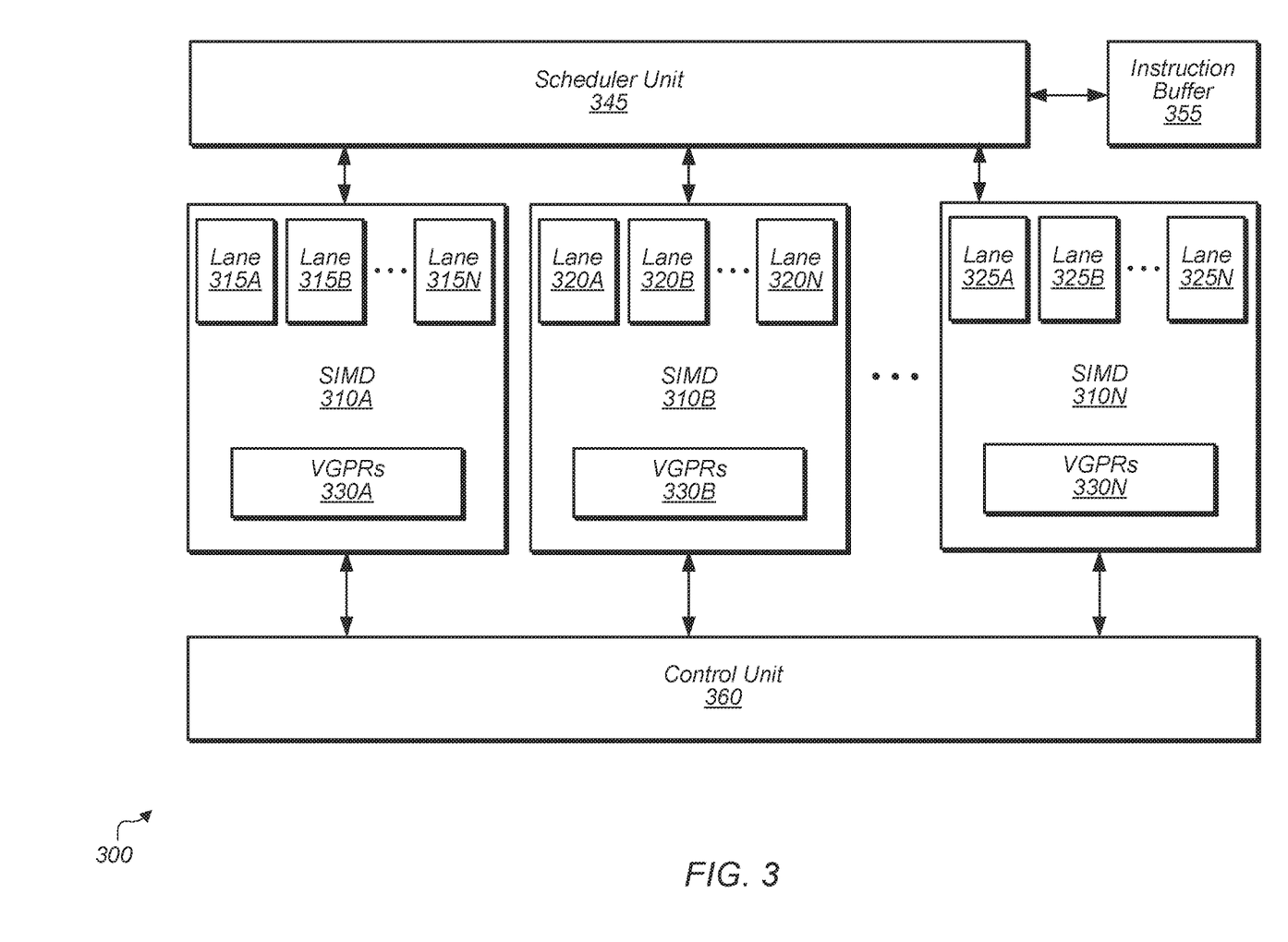
FIG. 3 is a block diagram of one implementation of a graphics processing unit (GPU).

Referring now to FIG. 3, a block diagram of one implementation of a graphics processing unit (GPU) 300 is shown. In one implementation, GPU 300 includes at least SIMDs 310A-N, scheduler unit 345, instruction buffer 355, and control unit 360. It is noted that GPU 300 can also include other logic which is not shown in FIG. 3 to avoid obscuring the figure. It is also noted that other processors (e.g., FPGAs, ASICs, DSPs) can include the circuitry shown in GPU 300.

In one implementation, GPU 300 executes instructions of a kernel on any number of wavefronts. These instructions are stored in instruction buffer 355 and scheduled for execution on SIMDs 310A-N by scheduler unit 345. In one implementation, each wavefront includes a number of work-items which execute on lanes 315A-N, 320A-N, and 325A-N in SIMDs 310A-N. Each lane 315A-N, 320A-N, and 325A-N of SIMDs 310A-N can also be referred to as an "execution unit".

In one implementation, GPU 300 receives a plurality of instructions for a wavefront with a number of work-items. When work-items execute on SIMDs 310A-N, each work-item is assigned a corresponding portion of vector general purpose registers (VGPRs) 330A-N. If a work-item is able to release some number of VGPRs 330A-N which have been assigned to the work-item, the work-item executes an instruction to release the number of VGPRs. In one implementation, control unit 360 receives an indication that the instruction has been executed, and control unit 360 reassigns these released VGPRs to one or more work-items in response to receiving the indication. This allows other work-items to use these VGPRs while the work-item which released the VGPRs is still active. While control unit 360 is shown as being external to SIMDs 310A-N, it should be understood that this is representative of only a single implementation. In other implementations, control unit 360 can be located elsewhere and/or control unit 360 can be split up into multiple different control units. For example, in another implementation, a separate control unit 360 is located in each SIMD 310A-N.

It is noted that the letter "N" when displayed herein next to various structures is meant to generically indicate any number of elements for that structure (e.g., any number of SIMDs 310A-N). Additionally, different references within FIG. 3 that use the letter "N" (e.g., SIMDs 310A-N and lanes 315A-N) are not intended to indicate that equal numbers of the different elements are provided (e.g., the number of SIMDs 310A-N can differ from the number of lanes 315A-N).

Figure 4:
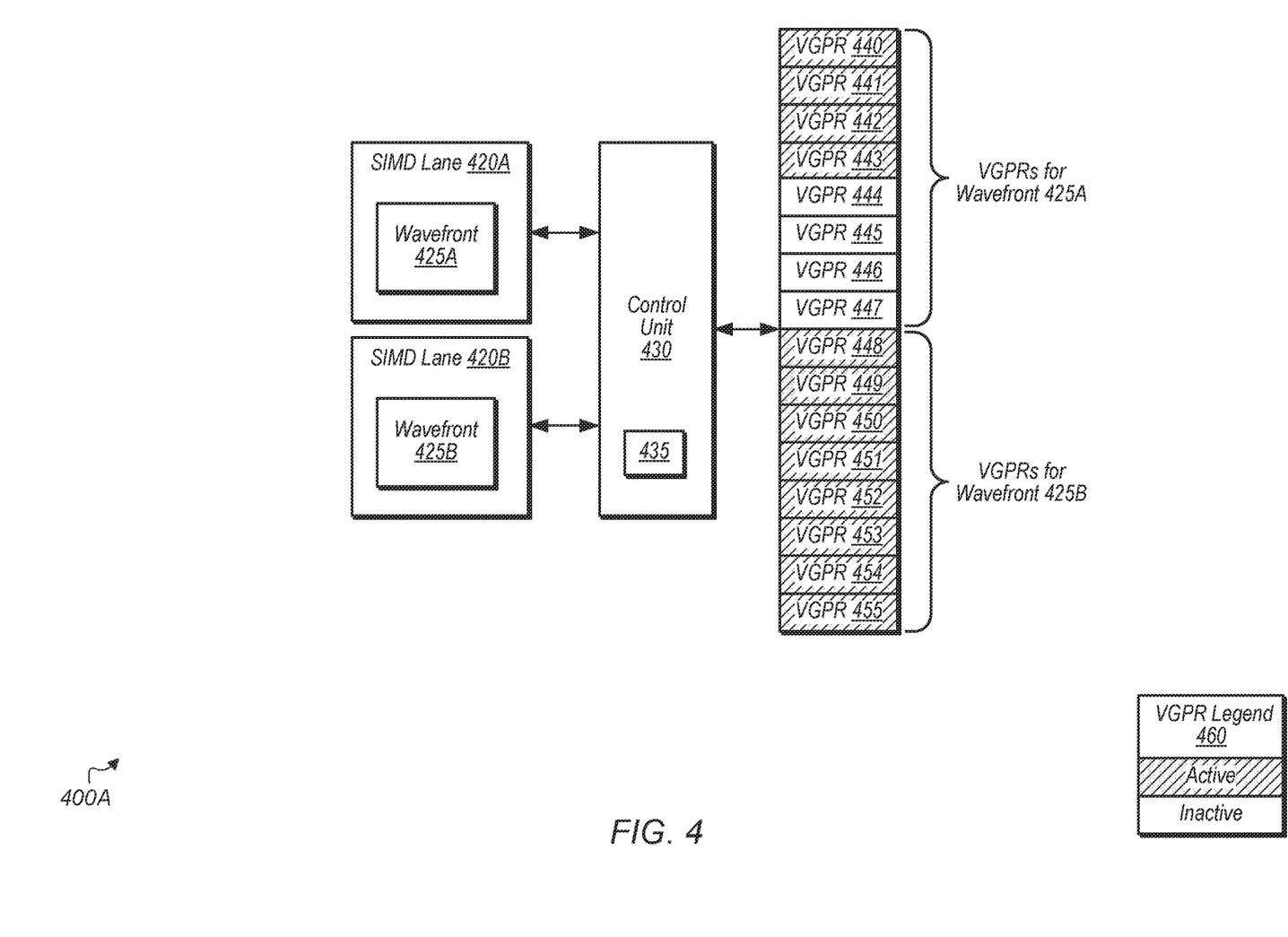
FIG. 4 is a block diagram of one implementation of wavefronts executing on a SIMD unit.

Turning now to FIG. 4, a block diagram of one implementation of wavefronts 425A-B executing on a SIMD unit 400A is shown. In one implementation, SIMD unit 400A is included within a compute unit (e.g., compute units 255A-N of FIG. 2) along with any number of SIMD units. As shown in FIG. 4, SIMD unit 400A includes execution lanes 420A-B which are executing wavefronts 425A-B. Although only two execution lanes 420A-B are shown in SIMD unit 400A, it should be understood that this is shown merely for illustrative purposes. Execution lanes 420A-B are representative of any number of lanes. Also, while 16 VGPRs 440-455 are shown in FIG. 4, it should be understood that other implementations can include other numbers of VGPRs besides 16.

In one implementation, VGPRs 440-447 are allocated for wavefront 425A when wavefront 425A is launched, and VGPRs 448-455 are allocated for wavefront 425B when wavefront 425B is launched. In one implementation, control unit 430 controls the access to VGPRs and ensures that each wavefront 425A-B accesses only those registers assigned to the wavefront. However, in various implementations, one VGPR may use less than the total number of registers allocated to it, and another wavefront may use all of the registers allocated to it and run inefficiently due to the inability to use additional registers. Such as a case is illustrated in FIG. 4 for wavefronts 425A-B.

As shown in FIG. 4, VGPRs 440-443 are active (i.e., in use) by wavefront 425A while VPGRs 444-447 are inactive (i.e., not being used). This is illustrated by the dashed lines through VGPRs 440-443 while VPGRs 444-447 have a clear background. VGPR legend 460 shows the meaning of the different shading of VGPRs for the implementation depicted in FIG. 4. In one implementation, when wavefront 425A detects that a block of registers are unused, wavefront 425A executes an instruction to notify control unit 430 that this block of registers can be freed and reallocated to another wavefront. In the example depicted in FIG. 4, this block of unused registers includes VPGRs 444-447. In another implementation, in response to detecting that a block of registers 444-447 are unused, wavefront 425A sends a message to control unit 430 in order to notify control unit 430. Detecting that the block of registers 444-447 are unused can be performed by a compiler, a programmer, or in real-time by wavefront 425A, control unit 430, or other circuitry. For example, compilation techniques such as liveness analysis to identify dead registers, or otherwise, may be used to determine when a register value is no longer needed and the register can be freed. In some implementation, this compilation is performed on kernels at runtime. In such cases, the compiler inserts an instruction indicating that a register (or registers) can be freed and reallocated as needed or desired. In other implementations, these compilation techniques are performed at a different time. In some implementations, the compiler compiles the code such that registers that are identified as becoming dead earlier during processing are placed earlier in an allocation range. In this manner, the probability of a range of registers becoming available for release earlier is increased. These and other techniques are known and are contemplated.

When control unit 430 receives the notification that the block of registers 444-447 are unused, control unit 430 updates register allocation mapping table 435 to indicate that this block of registers 444-447 is no longer assigned to wavefront 425A. Additionally, control unit 430 can assign this block of registers 444-447 to another wavefront. In the example depicted in FIG. 4, all of the registers allocated to wavefront 425B are active. In response to detecting that all of the registers allocated to wavefront 425B are active, or receiving an indication or notification of this scenario, in one implementation, control unit 430 reassigns VPGRs 444-447 to wavefront 425B.

Figure 5:
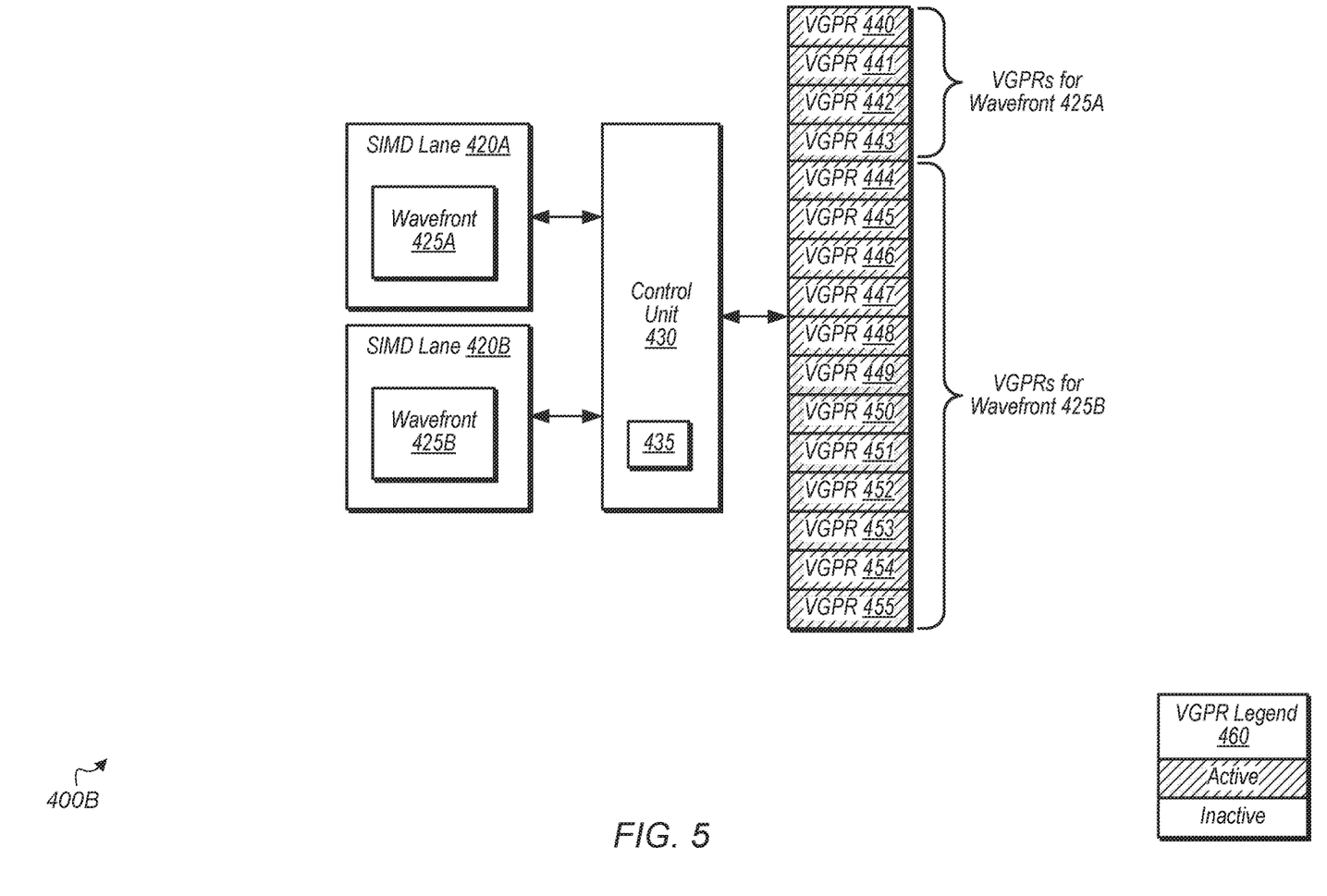
FIG. 5 is a block diagram of one implementation of wavefronts executing on a SIMD unit.

Referring now to FIG. 5, a block diagram of one implementation of wavefronts 425A-B executing on a SIMD unit 400B is shown. The discussion of FIG. 5 is intended to be a continuation of the discussion of FIG. 4. Accordingly, SIMD unit 400B is intended to represent SIMD unit 400A (of FIG. 4) at a later point in time after VGPRs 444-447 have been reassigned from wavefront 425A to wavefront 425B while wavefront 425A remains active. Also, at the point in time depicted in FIG. 5, VGPRs 444-447 are now in use by wavefront 425B. This is illustrated with the dashed lines in the background of the blocks representing VGPRs 444-447.

Figure 6:
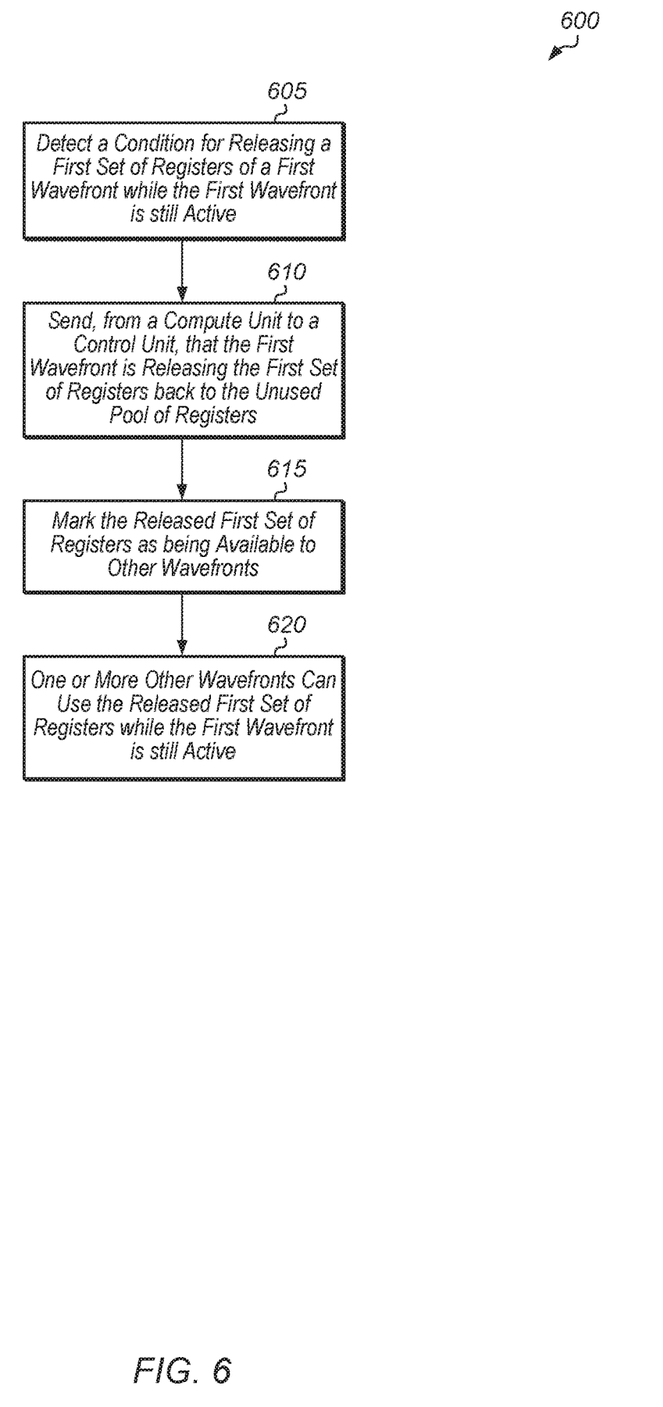
FIG. 6 is a generalized flow diagram illustrating one implementation of a method for performing an early release of registers by a wavefront.
Figure 7:
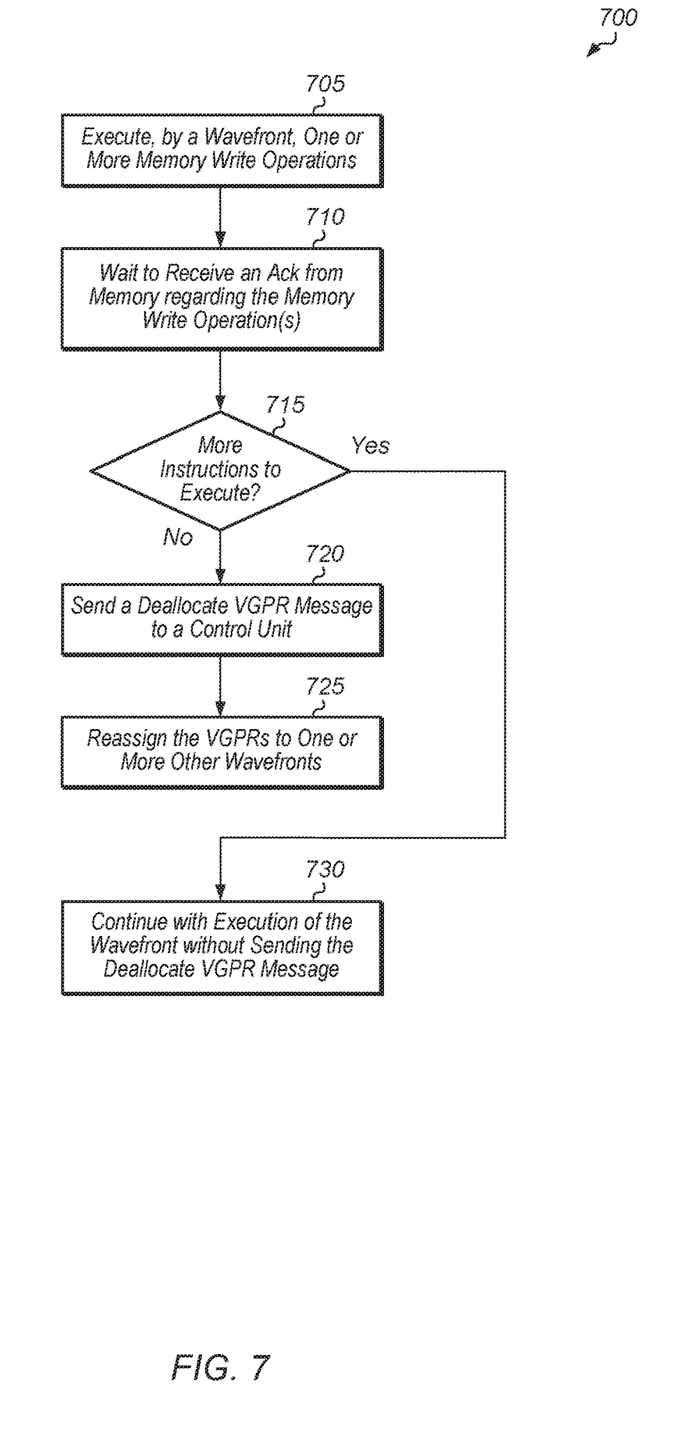
FIG. 7 is a generalized flow diagram illustrating one implementation of a method for releasing registers while waiting for an acknowledgment from memory.

Turning now to FIG. 6, one implementation of a method 600 for performing an early release of registers by a wavefront is shown. For purposes of discussion, the steps in this implementation and those of FIG. 7 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600.

A processor detects a condition for releasing a first set of registers (e.g., VGPRs) of a first wavefront while the first wavefront is still active (i.e., executing instructions) (block 605). In one implementation, the condition for releasing the first set of registers is the first wavefront waiting for an acknowledgment ("ack") from memory before completing termination. In another implementation, the condition for releasing the first set of registers is the first wavefront only using a portion of its assigned registers. In other implementations, other conditions for releasing the first set of registers can be detected. In one implementation, the first set of registers are the entirety of the registers that have been allocated to the first wavefront. In another implementation, the first set of registers are a portion of the registers that have been allocated to the first wavefront.

In response to detecting the condition, a compute unit sends a message to a control unit that the first wavefront is releasing the first set of registers back to the unused pool of registers (block 610). The control unit then marks the released first set of registers as being available to other wavefronts (block 615). In response, one or more other wavefronts can use the released first set of registers while the first wavefront is still active (block 620). After block 620, method 600 ends.

Referring now to FIG. 7, one implementation of a method 700 for releasing registers while waiting for an acknowledgment from memory is shown. A wavefront executes one or more memory write operations (block 705). Depending on the implementation, the wavefront includes any number of threads, from 1 to N, where N is a positive integer greater than one. Next, the wavefront waits to receive an acknowledgment (or ack, for short) from memory regarding the memory write operation(s) (block 710). While waiting for the ack, the wavefront determines if there are any more instructions other than waiting for an acknowledgment from memory (conditional block 715).

If there are no more instructions of the wavefront other than waiting for an acknowledgment from memory (conditional block 715, "no" leg), then the wavefront sends a deallocate VGPR message to a control unit (block 720). In one implementation, the deallocate VGPR message is inserted into the wavefront instructions by a compiler. In another implementation, the deallocate VGPR message is added by a programmer. In one implementation, the deallocate VGPR message specifies that all VGPRs should be deallocated. In another implementation, the deallocate VGPR message includes an identification of one or more, or a range, of VGPRs which should be deallocated. For example, in this implementation, the message includes an identification of a first register, offset, and/or range. In other implementations, other parameters can be included in the deallocate VGPR message.

In response to receiving the deallocate VGPR message, the control unit reassigns the VGPRs to one or more other wavefronts (block 725). After block 725, method 700 ends. Otherwise, if there are subsequent instructions of the wavefront still to be executed (conditional block 715, "yes" leg), then the wavefront continues with execution without sending the deallocate VGPR message (block 730). After block 730, method 700 ends.

Figure 8:
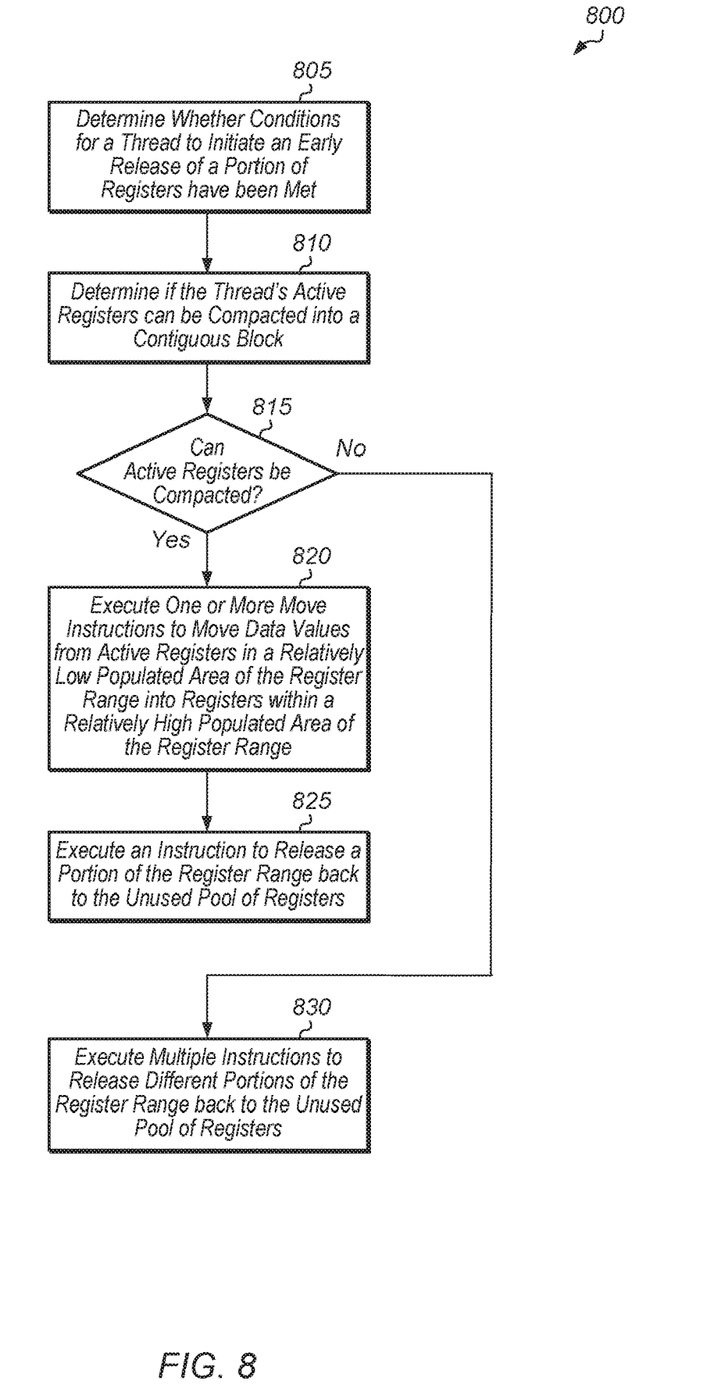
FIG. 8 is a generalized flow diagram illustrating one implementation of a method for performing register compaction during an early register release.

Turning now to FIG. 8, one implementation of a method 800 for performing register compaction during an early register release is shown. A processor determines whether conditions for a thread to initiate an early release of a portion of registers have been met (block 805). The one or more conditions can include having more than a threshold number of inactive registers, waiting for an ack from memory, the thread reaching a certain stage of execution, and so on. Inactive registers refer to registers that are allocated to the thread but that are not being used to store values that will be used by the thread. It will be assumed for the purposes of this discussion that the conditions for performing an early release of the portion of registers have been met.

In response to determining that the conditions for performing an early release of the portion of registers have been met, the processor determines if the thread's active registers can be compacted into a contiguous block (block 810). For example if the thread has been allocated register 0-63, and most active registers are in the range from registers 0-31, but only a few registers are active in the 32-63 range, this would indicate that registers could be moved down closer together so that a contiguous block could be released back into the register pool for other threads.

If the active registers can be compacted into a contiguous block (conditional block 815, "yes" leg), then the thread executes one or more move instructions to move data values from active registers in a relatively low populated area of the register range into registers within a relatively high populated area of the register range (block 820). In one implementation, active values are moved from registers in an upper portion (e.g., upper half) of the register range to registers in a lower portion (e.g., lower half) of the register range. In another implementation, active values are moved from registers in a lower portion of the register range to registers in an upper portion of the register range.

Different ways of performing conditional block 815 and block 820 can be employed depending on the implementation. In one implementation, a compiler inserts instructions into the thread's code to perform these steps. In this implementation, the compiler detects the conditions for performing an early release, determines if the active registers need to be compacted, and inserts move instructions to move registers to achieve the register compaction. In another implementation, a programmer inserts instructions into the thread's code to perform blocks 815 and 820. In a further implementation, circuitry in hardware performs blocks 815 and 820. For example, in one implementation, a register window for the thread is reduced to cover only a relatively high populated area of the register range. In this implementation, the register window for the thread is reduced so that it no longer covers a relatively low populated area of the register range. This would cause future accesses to registers in this relatively low populated area of the register range to go to memory. For example, in one implementation, a register window of the thread is reduced from covering registers 0-127 to covering only registers 0-63. Also, any combination of these ways of performing conditional block 815 and block 820 can be used in a single implementation. Also, other ways of performing conditional block 815 and block 820 are possible and are contemplated.

After block 820, the thread executes an instruction to release the portion of the register range back to the unused pool of registers (block 825). Alternatively, in block 825, the thread sends a message or activates a signal to release the portion of the register range back to the unused pool of registers. After block 825, method 800 ends. If the active registers cannot be compacted into a contiguous block (conditional block 815, "no" leg), then the thread executes multiple instructions to release different portions of the register range back to the unused pool of registers (block 830). Alternatively, the thread can execute a single instruction to release the largest unused portion of the register range back to the unused pool of registers in block 830. After block 830, method 800 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming; language, such as C. Alternatively, a hardware design language (MIL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
a plurality of registers; and
a control unit comprising circuitry configured to:
assign a given set of registers of the plurality of registers for exclusive use by a first wavefront;
responsive to one or more registers from the given set of registers no longer being needed by the first wavefront:
move one or more register values from the one or more registers to one or more different locations in the given set of registers;
deallocate the one or more registers from the first wavefront; and
assign at least one of the one or more registers for exclusive use by a second wavefront while both the first wavefront and the second wavefront remain active.

2. The processor as recited in claim 1, wherein the one or more registers are deallocated responsive to the first wavefront executing a release instruction, and wherein the first wavefront remains active after executing the release instruction.

3. The processor as recited in claim 1, wherein the control unit is configured to deallocate the one or more registers responsive to receipt of an indication from the first wavefront generated in response to:
one or more instructions of the first wavefront having not yet completed execution; and
the one or more instructions remaining to be completed only include instructions waiting for an acknowledgment from a memory.

4. The processor as recited in claim 1, wherein the one or more registers of the given set of registers are compacted into one or more contiguous blocks of registers prior to reassignment of the one or more registers for exclusive use by the second wavefront.

5. The processor as recited in claim 1, wherein deallocation of the one or more registers from the first wavefront causes the control unit to return the one or more registers of the given set of registers to an available pool of registers.

6. The processor as recited in claim 1, wherein the one or more registers are deallocated responsive to receiving a message from the first wavefront, and wherein the message includes a register base address, a size, and an identifier (ID) of the first wavefront.

7. The processor as recited in claim 1, wherein the control unit is configured to move the one or more register values of the one or more registers from a first location of a register range to a second location of the register range of the given set of registers, responsive to a number of register values stored at the first location being lesser than a number of register values stored at the second location.

8. A method comprising:
assigning, by circuitry of a control unit, a given set of registers for exclusive use by a first wavefront;
responsive to one or more registers from the given set of registers no longer being needed by the first wavefront:
moving, by the control unit, one or more register values from the one or more registers to one or more different locations in the given set of registers;
deallocating, by the control unit, the one or more registers from the first wavefront; and
assigning, by the control unit, at least one of the one or more registers for exclusive use to a second wavefront, while both the first wavefront and the second wavefront remain active.

9. The method as recited in claim 8, further comprising deallocating the one or more registers responsive to the first wavefront executing a release instruction, and wherein the first wavefront remains active after executing the release instruction.

10. The method as recited in claim 8, further comprising deallocating the one or more registers responsive to receipt of an indication from the first wavefront generated in response to:
one or more instructions of the first wavefront having not yet completed execution; and
the one or more instructions remaining to be completed only including instructions waiting for an acknowledgment from a memory.

11. The method as recited in claim 8, further comprising compacting the one or more registers of the given set of registers into one or more contiguous blocks of registers, prior to assigning the one or more registers of the given set of registers for exclusive use by the second wavefront.

12. The method as recited in claim 8, further comprising returning the one or more registers of the given set of registers to an available pool of registers responsive to deallocating the one or more registers.

13. The method as recited in claim 8, wherein the one or more registers are deallocated responsive to receiving a message from the first wavefront, and wherein the message includes a register base address, a size, and an identifier (ID) of the first wavefront.

14. The method as recited in claim 8, further comprising moving the one or more register values of the one or more registers from a first location of a register range to a second location of the register range of the given set of registers, responsive to a number of register values stored at the first location being lesser than a number of register values stored at the second location.

15. A system comprising:
a memory; and
a processor coupled to the memory;
wherein the processor comprises circuitry configured to:
assign a given set of registers for exclusive use by a first wavefront being launched on a first compute unit of a plurality of compute units;
responsive to one or more registers of the given set of registers no longer being needed by the first wavefront:
move one or more register values from the one or more registers to one or more different locations in the given set of registers;
deallocate the one or more registers from the first wavefront; and
assign at least one of the one or more registers for exclusive use by a second wavefront while both the first wavefront and the second wavefront remain active.

16. The system as recited in claim 15, wherein the one or more registers are deallocated responsive to the first wavefront executing a release instruction, and wherein the first wavefront remains active after executing the release instruction.

17. The system as recited in claim 15, wherein the processor is configured to deallocate the one or more registers responsive to receipt of an indication from the first wavefront generated in response to:
one or more instructions of the first wavefront having not yet completed execution; and
the one or more instructions remaining to be completed only include instructions waiting for an acknowledgment from a memory.

18. The system as recited in claim 15, wherein the one or more registers of the given set of registers are compacted into one or more contiguous blocks of registers prior to assigning the one or more registers of the given set of registers for exclusive use by the second wavefront.

19. The system as recited in claim 15, wherein deallocation causes the processor to release the one or more registers of the first set of registers to an available pool of registers.

20. The system as recited in claim 15, wherein the one or more registers are deallocated responsive to receiving a message from the first wavefront, and wherein the message includes a register base address, a size, and an identifier (ID) of the first wavefront.

* * * * *